May 5, 1964

A. J. BENT 3,131,573

DEVICE FOR SELECTIVELY OR CONCURRENTLY CONTROLLING
A PLURALITY OF ACTUATORS

Filed Sept. 17, 1959

INVENTOR.
Arthur J. Bent
BY
Henry E. Otto Jr
Attorney

May 5, 1964

A. J. BENT 3,131,573

DEVICE FOR SELECTIVELY OR CONCURRENTLY CONTROLLING
A PLURALITY OF ACTUATORS

Filed Sept. 17, 1959

INVENTOR.
*Arthur J. Bent*
BY *Henry E. Otto Jr.*
*Attorney*

May 5, 1964 A. J. BENT 3,131,573
DEVICE FOR SELECTIVELY OR CONCURRENTLY CONTROLLING
A PLURALITY OF ACTUATORS
Filed Sept. 17, 1959 4 Sheets-Sheet 4

INVENTOR.
*Arthur J. Bent*
BY
*Attorney*

United States Patent Office 3,131,573
Patented May 5, 1964

3,131,573
DEVICE FOR SELECTIVELY OR CONCURRENTLY CONTROLLING A PLURALITY OF ACTUATORS
Arthur J. Bent, Pittsburgh, Pa., assignor to Westinghouse Air Brake Company, Wilmerding, Pa., a corporation of Pennsylvania
Filed Sept. 17, 1959, Ser. No. 840,568
12 Claims. (Cl. 74—471)

This invention relates to unitary valve devices of the type comprising a plurality of valve mechanisms operable, selectively or concurrently, by a single operating handle to remotely control operation of various devices or actuators that are controlled pneumatically by the respective valve mechanisms.

Valve devices of this general type have heretofore been employed in a wide variety of applications, such as on power shovels to control selective swinging of the cab and boom in one direction or the opposite direction and concurrently or selectively control actuation of a pneumatic horn.

The principal object of the invention is to provide a valve device of the above general type which is less expensive to manufacture than those heretofore proposed and embodies various features, including among others the following.

The improved valve device comprises a spider-like operating element rigidly mounted on a universally tiltable handle shaft and having a plurality of circumferentially-spaced rockably depressible fingers for selectively operating one or the other of two valve mechanisms and concurrently or selectively actuating a third valve mechanism.

Each of these two valve mechanisms is of the balanced self-lapping type controlled by opposing pressures of fluid in a respective delivery chamber and of a regulating spring of adjustable preload acting on a piston; said mechanism being operable to provide in such delivery port fluid at a selectable pressure corresponding to the extent of compression of the regulating spring responsively to depression of the corresponding finger. Means, including a return spring and a stop for the piston, are provided for returning the handle shaft precisely to and preventing overcasting of said shaft beyond, a normal position upon release of manual force from said shaft. A slider is mountable on the handle shaft in either of two rotative positions and spring-biased toward contact with a spherical surface provided on the body of the valve device. When the slider is in one rotative position, a groove provided in a concave surface thereof is registerable with spaced detents provided on separate great circles of said spherical surface, so that when either of said detents projects into said groove, the handle shaft will be maintained in a corresponding position by the action of such spring bias, permitting release of force from the handle. If desired, this holding feature can be eliminated by mounting the slider in the other rotative position. Sintered metal annular elements are used to not only serve as air strainers for straining air supplied to supply and delivery chambers, respectively, but also to serve as a spacer and as a stop limiting downward travel of the piston, respectively. Also, by simple adjustment and without substitution of any parts, these valve mechanisms may readily be adjusted to operate as non-self-lapping or "on-off" type valve mechanisms.

The third valve mechanism, which is a somewhat different construction than the said two mechanisms, may be of a non-self-lapping type readily convertible to a self-lapping type valve mechanism by changing two components. In either event, such third valve mechanism likewise embodies means for preventing its return spring from biasing the handle shaft beyond normal position when manual force is removed from said shaft.

Other objects and advantages will become apparent from the following more detailed description of the invention and from the accompanying drawings, wherein.

Description—FIGS. 1 to 6

As shown in these figures, the valve device embodying the invention comprises a sectionalized body 1 comprising a dome-like upper section 2 secured, by lock screws (not shown) inserted in holes 3 (FIG. 5), to a central section 4 which, in turn, is secured to a lower section 5 by screws 6 that also serve to clamp perforated spring seat and stop plates 7, 7' (FIG. 1) between said sections 4, 5. Body section 5 has tapped holes 8 to accommodate other screws (not shown) for mounting the device at either side on a machine with which it is to be employed. In the lower end of section 5 (FIG. 3) are provided a supply port 9, three separate delivery ports 10, 11 12 leading to different actuators or the like in which pressure is to be controlled, and two exhaust ports 13, 14; and another exhaust port 15 is provided in the side wall of section 4.

Figure 1:
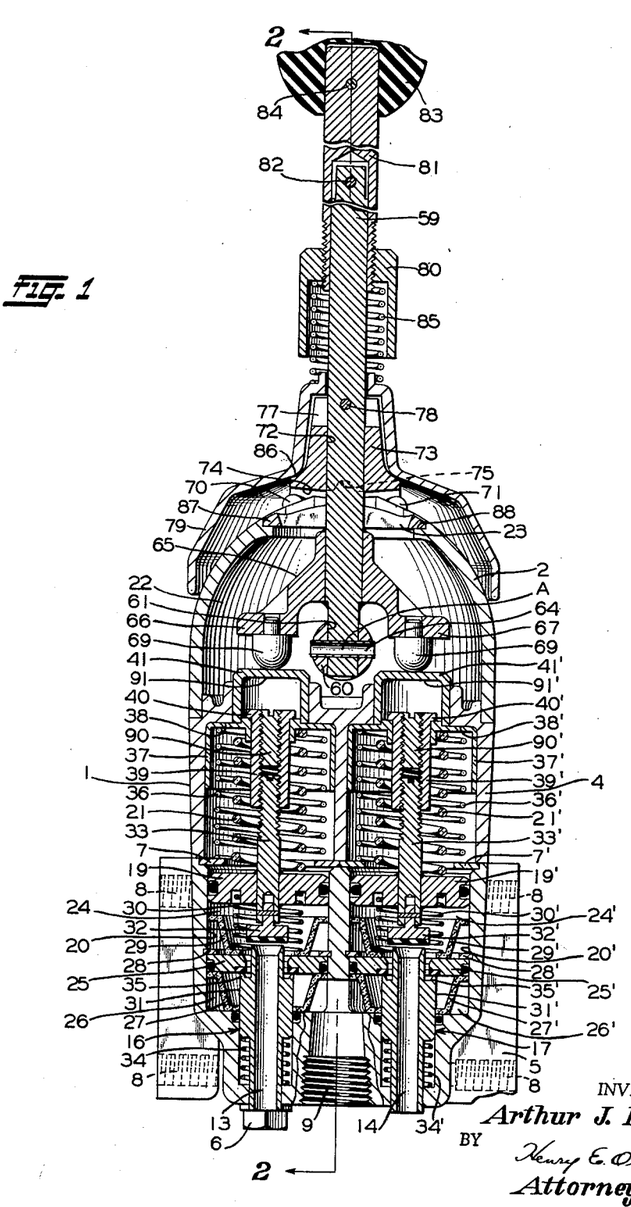
FIG. 1 is an elevational section view of a valve device embodying the invention.
Figure 2:
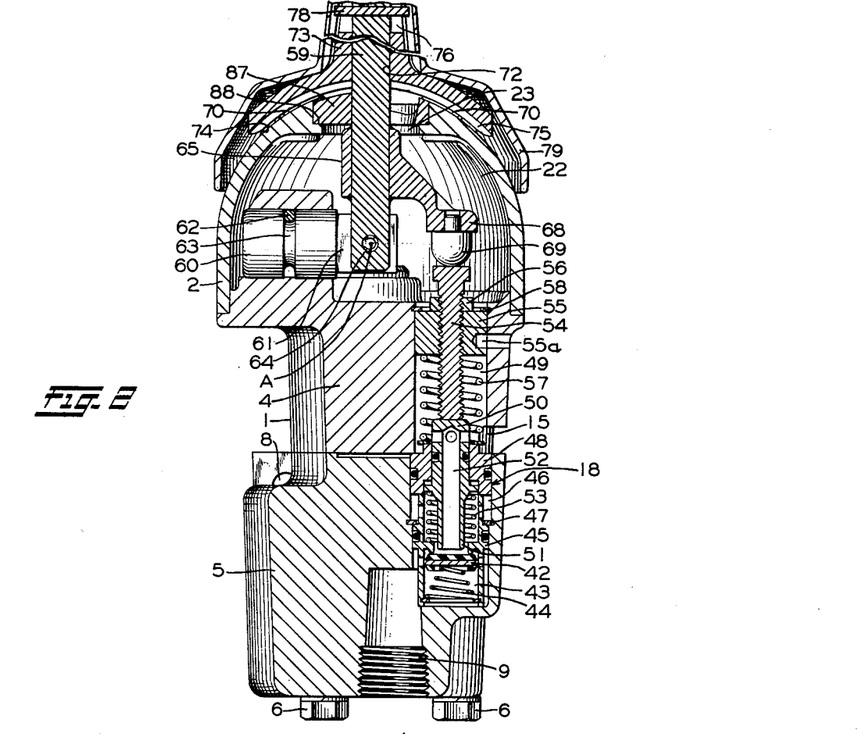
FIG. 2 is a section view taken along the line 2—2 of FIG. 1.
Figure 3:
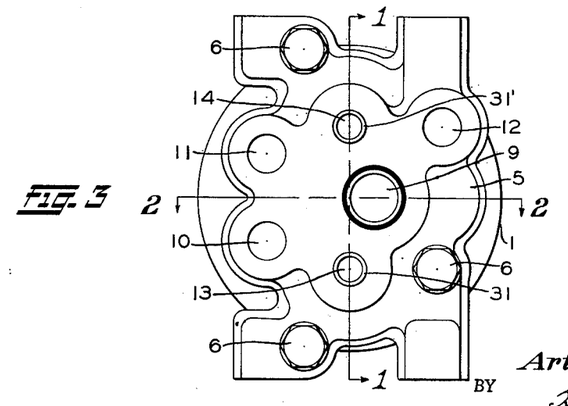
FIG. 3 is an outline view looking up at the lower end of the valve device as shown in FIG. 2, the lines 1—1 and 2—2 on FIG. 3 indicating the manner in which the section views of FIGS. 1 and 2, respectively, are taken.
Figure 4:
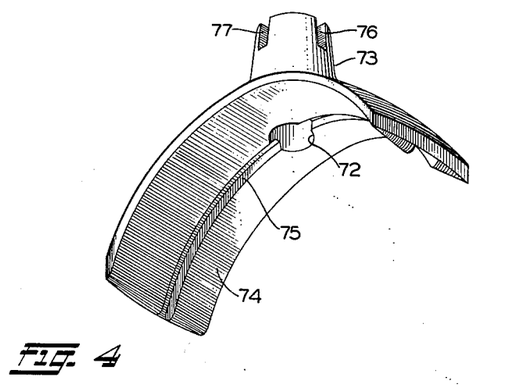
FIGS. 4 and 5 are isometric views of a slider and a spherical dome-shaped portion of the valve body, respectively, shown in section in FIGS. 1 and 2.

For sake of illustration, the body is shown as enclosing two identical self-lapping type valve mechanisms designated generally as 16, 17 (FIG. 1) and a single non-self-lapping type supply vent valve mechanism designated generally as 18 (FIG. 2). Each of these valve mechanisms 16, 17, 18 is spaced horizontally from the other and each comprises vertically movable components hereinafter to be described.

Valve mechanism 16 comprises a piston 19 sealingly reciprocable in a bore 20 in section 5 and subject at one side to pressure of a normally caged helical regulating spring 21 in a chamber 22 open to atmosphere via a central opening or slot 23 in dome 2 and subject at the opposite side to pressure of fluid in a delivery chamber 24 that is constantly open to the corresponding delivery port 10. An annular supply valve seat member 25 has sealing contact with bore 20 below piston 19 and separates chamber 24 from a supply chamber 26 constantly open to supply port 9. Member 25, which is in the nature of a removable annular partition, is held stationary in a desired vertical position, preferably by resting on an annular dish-shaped spacer element 27 in chamber 26 and being held down by a snap ring 28 in chamber 24. A similar annular dish-shaped stop element 29 is contained in chamber 24 and maintained in contact with member 25 by a light helical spring 30 that bears against the lower side of piston 19, said element 29 serving as a stop to limit downward movement of said piston. The elements 27, 29 are preferably formed of sintered metal to serve as air strainers are reduce cost as well as perform the other special functions just described.

An annular member 31 comprises tubular end portions, the lower of which has slidably guided contact with the wall of the respective exhaust port 13, and the upper of which projects with substantial radial clearance through the central opening in annular member 25 and projects into delivery chamber 24. At its upper end the member 31 is beveled so as to define a seat for a disc-shaped exhaust valve 32. Valve 32 is coaxially connected (preferably by a pin in a slightly oversize hole to correct for slight misalignment, if any, of valve 32 and its seat) to the depending portion of a valve stem 33 welded or otherwise positively secured to piston 19. Intermediate its ends, member 31 has an enlarged diameter portion which is sealingly reciprocable in a bore that is open to chamber 26 and joined by a shoulder to the respective exhaust port 13; and a light helical spring 34 seats against said shoulder and bears against the lower end of said enlarged portion for biasing member 31 upward to cause an annular rib-like supply valve 35 formed at the upper end of said portion to normally seat against a seat carried by the underside of seat member 25 in encirclement of the annular opening therethrough.

It will thus be noted that supply valve 35 is contained in supply chamber 26 and controls connection of said chamber via the central opening in member 25 with the delivery chamber 24 and hence the associated delivery port 10; whereas exhaust valve 32 is contained in delivery chamber 24 and controls connection of the latter with the corresponding exhaust port 13 by way of the central opening through annular member 31.

A light helical return spring 36 encircles spring 21 and bears against plate 7 for biasing an annular spring follower 37 into normal contact with an annular stop shoulder 38. A sleeve 39, which is reciprocable in the central bore through follower 37, has an outwardly directed flange 40 that overlies the upper end of said follower. The upper part of valve stem 33 is adjustably screw-threaded into the lower part of sleeve 39 to define the normal unseated position of the exhaust valve 32. It will be noted that when flange 40 engages follower 37, as shown, regulating spring 21 will be caged (i.e., rendered ineffective) because said spring will act downwardly on piston 19 and through the stem 33 and said flange will act downwardly on said follower; and said spring will be uncaged only when said follower is moved downwardly relative to said flange. An inverted cup or thimble 41 which passes over the top of flange 40 is depressible in the manner hereinafter to be described for shifting follower 37 downward.

The components of valve mechanism 17 which are identical with those of mechanism 16, just described, have been given the same reference numerals except that such numerals have been primed. It will be understood that exhaust valve 32' controls connection of delivery chamber 24' and delivery port 11 with the corresponding exhaust port 14, and that supply valve 35' controls connection of said delivery chamber and delivery port with the common supply port 9 which is open to supply chamber 26'.

Valve mechanism 18 comprises a poppet-type supply valve 42 which is contained in a chamber 43 open to common supply port 9 and is biased by a light helical spring 44 in said chamber into seating contact with an annular valve seat rib provided in a bushing 45. Supply valve 42 controls communication between supply chamber 43 and a delivery chamber 46 that is open via radial ports in said bushing to delivery port 12. A snap ring 47 in chamber 46 holds the bushing 45 in a fixed position in contact with the end wall of chamber 43, and an O-ring seal carried by said bushing prevents leakage of pressure fluid from chamber 43 to chamber 46 along the bushing bore. An annular member 48, held down by body section 4 in abutting contact with bushing 45, separates chamber 46 from an exhaust chamber 49 open to exhaust port 15 and carries an O-ring seal to prevent leakage along the outside of said member from chamber 46 to chamber 49. An exhaust valve member 50 has sealing slidably guided contact with the central bore of member 48 and comprises a tubular depending portion defining an exhaust valve 51 that is disposed in chamber 46. Valve 51, which is arranged coaxially with and seatable against supply valve 42, contains a bore-like opening 52 always open to exhaust chamber 49. A light helical spring 53 in chamber 46 biases the valve member 50 into sealing contact with the lower end of a screw 54 that is adjustably threaded into a plunger 55 and projects upwardly therethrough and through a lock nut 56 into dome 2. Plunger 55 is biased by a helical return spring 57 into contact with a snap ring 58 to limit upward movement of screw 54 for reasons hereinafter explained. A transverse hole 55a, which is provided in the exterior of the plunger 55, is normally aligned with a side port in body section 4 to accommodate a holding bar to prevent rotation of the plunger so that the effective height of screw 54 relative thereto may be adjusted (by a wrench applied to its upper end) without removing the snap ring 58 and plunger.

Selective and concurrent operation of the valve mechanism 16, 17, 18 is effected through the medium of a control shaft or handle shaft 59. Shaft 59 extends down through opening 23 into dome 2 and has a lower portion with parallel flat sides that extends into a slot 61 cut diametrically through a generally cylindrically shaped pivot member 60. Member 60 is disposed in a bore with a horizontal axis provided in a portion of body section 4 that projects up into dome 2; and a transverse pin 62 projects through said portion and tangentially through a member-encircling groove 63 so as to permit said member to rotate, but not shift axially, in said bore. The lower portion of shaft 59 is pivotally connected to member 60 by an expansible split-sleeve-type, or ordinary solid, pin 64 that passes transversely through slot 61 and has an axis which intersects at right angles, the axes of said shaft and member, with the result that the shaft can be rocked universally relative to the pivot point A at which these three axes intersect.

Coaxially secured to the shaft 59, within dome 2 and above member 60, is an operating element 65 having three spider-like fingers 66, 67, 68 extending radially outward from the shaft axis and arranged such that finger 68 extends at right angles to the oppositely arranged fingers 66, 67. A plurality of lugs 69, each press fit into, and depending from, the outer part of the respective fingers 66, 67, 68, preferably have hemispherical-shaped rounded lower ends for contacting the upper ends of thimble 41, thimble 41' and screw 54 respectively. Thus, the return springs 36, 36', 57 operatively act through the parts 41, 41', 54 and corresponding lugs 69 to bias the shaft 59 to a normal position, in which it is shown, and in which the shaft is vertically centered within opening 23 and in which the respective exhaust valves 32, 32', 51 are unseated and the respective supply valves 35, 35', 42 are seated.

Figure 5:
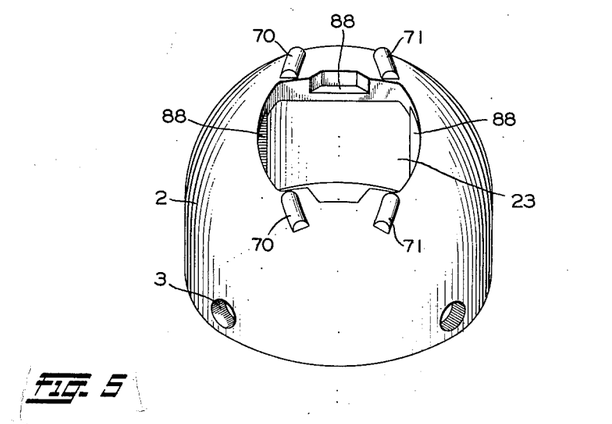

As best shown in FIG. 5, the dome 2 has a spherical upper surface, all points of which are equidistant from pivot point A. Two pairs 70, 71 of semi-cylindrical detents are so molded or welded to said spherical surface as to lie in separate great circles of said spherical surface at opposite sides of a plane bisecting opening 23; and each of said pairs comprises one detent disposed adjacent one transverse side of opening 23 and another detent disposed adjacent the opposite transverse side of said opening.

The shaft 59 passes through a central bore 72 provided in a cylindrical portion of a rider or slider 73; and said portion joins two integrally formed, oppositely extending, symmetrical curved wings defining a lower concave surface 74 into which is cut a longitudinally extending central groove 75. A spline-like connection is provided for rotatably locking the slider 73 in either of two predetermined rotative positions at substantially right angles to each other, relative to the shaft 59, while permitting some axial movement of the slider relative to the shaft. To reduce cost, it is preferred that this connection be of the pin-and-slot type effected, for example, by a pin 78 passing transversely through the axis of shaft 59 and adapted to extend into either of two transverse slots 76, 77 (see FIG. 4) cut at right angles to each other in the upper part of the slider's cylindrical portion, such that the slot 76 and groove 75 lie in the same vertical plane. When the slider 73 is locked in one of these rotative positions, in which pin 78 extends into slots 76, as shown, the slider is disposed so that, as viewed in FIG. 1, the detents 70 or 71 may enter the slider groove 75 upon sufficient counterclockwise or clockwise rocking, respectively, of shaft 59 relative to point A. If, however, the detent feature is not desired, then the slider 73 is mounted on shaft 59 in its other rotative position, in which pin 78 extends through the shaft and into slot 77 for disposing the groove 75 transversely of the great circle axes of the detents 70, 71.

A hood 79 is slidably mounted on shaft 59 above slider 73 to exclude entry of dirt into the body via dome opening 23. An inverted cup-shaped spring stop nut 80 is screw-threaded onto a depending threaded sleeve portion of a handle extension 81 of selectable length that is slid over, and staked by a transverse pin 82 to, the upper part of shaft 59; and a ball-shaped handle 83 is staked by a transverse pin 84 to the upper part of said handle extension. However, if no handle extension is to be used, nut 80 may be screwed onto shaft 59. A helical spring 85 backed up by nut 80 bears with moderate force on the upper end of hood 79 for transmitting therefrom to the slider 73, such as at 86, a downward force sufficient to overcome the centering action of the return springs 36, 36' and thus prevent the slider and hence the shaft 59 from recentering itself in the previously defined normal position if manual force is relieved from the handle 83 at a time when the detents 70 or 71 project into the slider groove 75. It is to be noted, however, that the return springs 36, 36' will operatively recenter the shaft 59 and hence handle 83 when the detents 70 or 71 are not in slider groove 75, such as will occur at less than maximum counterclockwise or clockwise rocking (as viewed in FIG. 1) of shaft 59 about point A and will occur in any position of the handle if, in order to eliminate this detent or holding feature, the slider 73 is mounted in its previously described other rotative position (that is, under the condition where pin 78 passes through slot 77 instead of slot 76). It will also be noted that the return spring 57 of mechanism 18 will always be effective, even if slider groove 75 is aligned with detents 70 or 71, to bias the handle 83 to a mid-position forward and rearward as viewed in FIG. 1, for thus causing unseating of exhaust valve 51 unless appropriate manual force is maintained on said handle; said mid-position being defined by lateral contact of the handle with an insert 87 that is pressed into and rests on a ledge 88 surrounding dome opening 23. This particular form of insert 87 is employed in the illustrated device because no valve mechanism is shown disposed opposite mechanism 18, and it also serves to define the maximum permissible degree of rocking of the handle and hence shaft 59 in both lateral and transverse directions. It will be understood that other inserts can be used to vary the degrees of such rocking, as desired; and blank out of operation any valve mechanism which is not to be employed in a particular application. Other inserts may also provide an L- or U-shaped opening requiring lateral movement of the shaft 59 a predetermined degree before enabling transverse movement thereof, to thereby prevent operation of the valve mechanisms 16, 17, 18 except in a desired sequence.

*Operation—FIGS. 1 to 6*

Assume initially that the common supply port 9 is charged by connection to a suitable source (not shown) of compressed air; that the delivery ports 10, 11 of the self-lapping-type valve mechanisms 16, 17 are connected to separate remotely controlled devices in which it is desired to selectively provide fluid at selectable pressures (for example, air cylinders for controlling selective engagement of respective clutches that control clockwise and counterclockwise swinging, respectively, of the boom and cab of a power shovel); and that the delivery port 12 of the non-self-lapping valve mechanism 18 is connected to a device which is normally vented and is to be charged from time to time with fluid at the pressure provided in the supply port 9 (for example, a pneumatic horn which may be blown at any time while the boom is stationary or is swinging in either direction). Assume also that no manual force is being applied to handle 83, and that shaft 59 is operatively biased to its normal position by the centering action of the return spring 36, 36', 57.

Under the assumed conditions, the respective exhaust valves 32, 32', 51 will be concurrently unseated for venting the associated delivery ports 10, 11, 12 and the respective supply valves 35, 35', 42 will be concurrently seated for cutting off said delivery ports from the common supply port 9. Hence, the various components will be in the respective positions in which they are shown in FIGS. 1 and 2.

If the operator desires to supply fluid at a selectable pressure to the device connected to delivery port 10, he shifts handle 83 leftward, as viewed in FIG. 1, to rock shaft 59 and hence operating element 65 counterclockwise an appropriate degree relative to point A and, through the corresponding lugs 69 and thimble 41, shift follower 37 of valve mechanism 16 downward out of contact with stop shoulder 38 against resistance of return spring 36 and regulating spring 21, compressing or preloading spring 21 to a corresponding degree. Meanwhile, spring 21 will shift piston 19 down against the light force of spring 30 and successively seat exhaust valve 32 against supply valve 35 and then unseat the latter against the light bias of spring 34 for supplying pressure fluid from supply port 9 to delivery chamber 24 and thence to the device to which delivery port 10 is connected. It will be noted that piston 19 will initially move downward in unison with follower 37 through a "pick-up" zone until the piston hits stop element 29 because spring 21 will act via said piston and stem 33 to hold flange 40 in contact with said follower; but as soon as piston 19 hits said stop element, the thimble 41 and spring follower 37 will move downward relative to said piston and hence flange 40 an extent corresponding to the degree the handle shaft 59 is rocked beyond said "pick-up" zone for preloading the regulating spring 21 a corresponding degree. As soon as sufficient pressure is developed in delivery chamber 24 to overcome the preselected preload on spring 21, said piston will move upward and thus shift flange 40 further upward relative to the follower and at the same time retract the exhaust valve 32 until the valve mechanism 16 attains a lap position, in which supply valve 35 is seated by spring 34 and exhaust valve 32 is seated against said supply valve. Thus, with the mechanism in lap position, fluid will be bottled up in the delivery chamber 24 and associated port 10 at a desired pressure corresponding to the preselected preload applied to spring 21 as determined, in turn, by the operator-controlled degree of counterclockwise rocking movement of handle 83 and thus of shaft 59 and slider 73, as viewed in FIG. 1. With the valve device hooked up as above explained for purposes of discussion, the pressure of fluid provided in port 10 will determine the degree of engagement of a slip clutch and hence the speed at which the boom and cab are swung in one direction.

By moving handle 83 rightward, as viewed in FIG. 1, handle shaft 59 and element 65 will be rocked clockwise a corresponding degree relative to point A and actuate valve mechanism 17 in a manner similar to that just described in connection with valve mechanism 16 for providing fluid at a corresponding pressure in the associated delivery port 11. In the illustrative hook-up above assumed, the pressure of fluid provided in port 11 will determine the degree of engagement of an associated pneumatically controlled slip clutch and hence the speed at which the boom and cab are swung in the opposite direction.

If the handle shaft 59 is rocked counterclockwise or clockwise far enough to carry the slider groove 75 into registry with detents 70 or 71, respectively, spring 85 acting through hood 79 will exert sufficient downward force on slider 73 to hold handle 83 in such position. This will permit the operator to remove his hand from the handle and do some other act, such as for example, manipulating another similar valve device embodying self-lapping valve mechanisms like 16, 17 for controlling a pneumatically engaged clutch or pneumatically released spring applied brake, respectively, that control raising and lowering of the boom and bucket and also embodying a valve mechanism like 18 for controlling tripping of the bucket gate.

If manual force is released from handle 83 (after disengaging the slider 73 from detents 70 or 71, if necessary), the handle shaft 59 will be automatically recentered in an upright position, as viewed in FIG. 1, by action of the return spring 36 or 36', as the case may be. Overcasting of the handle shaft 59 is positively prevented by the plates 7, 7' which stop the upward movement of the pistons 19, 19', respectively, and thus prevent such pistons from carrying flanges 40, 40' upward far enough to abut thimbles 41, 41' and through such abutment transmit a force to the element 65 that would undesirably rock handle shaft 59 beyond centered position and thus cause undesired operation of the associated valve mechanism 17 or 16, respectively.

Handle 83 may at any time be pushed forward as viewed in FIG. 1 (that is rightward as viewed in FIG. 2) so as to cause shaft 59 and operating element 65 to rock clockwise, as viewed in FIG. 2, relative to point A. As finger 68 is thus rocked downward, it will through the corresponding lug 69 push screw 54 downward against the force of return spring 57. Screw 54 will, in turn, transmit a direct-acting axial thrust force to member 50, shifting the latter against the light force of spring 53 to successively seat exhaust valve 51 against supply valve 42 and then unseat the latter against the bias of spring 44. With valve 42 unseated, fluid at the full pressure provided in supply port 9 will flow past said valve and via chamber 46 to delivery port 12, for actuating a device such as the pneumatic horn in the illustrative hook-up above assumed. The supply valve 42 will remain unseated only as long as the clockwise-acting manual force, as viewed in FIG. 2, is maintained on the handle shaft 59; and when such force is removed (even if slider groove 75 is then in registry with either detents 70 or 71), the return spring 57 will bias plunger 55 upward into contact with stop ring 58, and through screw 54, return the handle shaft to, and prevent movement of said shaft beyond its original upright position, as viewed in FIG. 2, for permitting the springs 44, 53 to respectively reseat the supply valve 42 and unseat the exhaust valve 51 and thus vent the delivery port 12.

Figure 6:
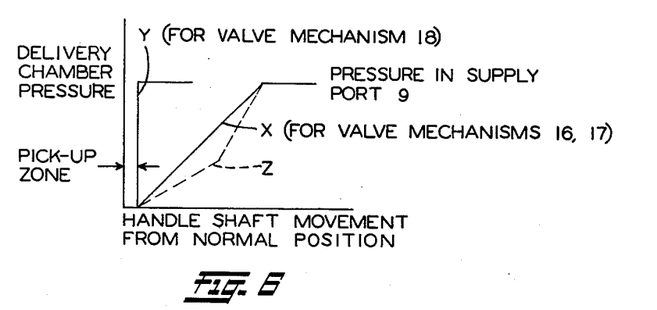
FIG. 6 is a curve illustrating the manner in which pressure in the delivery ports of the respective component valve mechanisms varies with the degree of rocking of the handle shaft out of the normal vertical position in which it is shown in FIGS. 1 and 2.

It will be noted that the valve mechanisms 16, 17 are of the so-called balanced type and are selectively actuatable, to perform one or another of two control functions demanding a selectable fluid pressure within a given range of pressures (see curve X of FIG. 6) according to whether the handle 83 and its shaft 59 are rocked in one direction or the opposite direction in one plane; and that the valve mechanism 18 is actuatable at any time either selectively or concurrently with the actuation of mechanism 16 or 17 to perform a third control function demanding either full pressure or no pressure (see curve Y of FIG. 6). It will be understood that the slopes of the delivery pressure vs. handle shaft movement curves need not necessarily be identical as shown by the single curve X, but may be independently adjusted by, for example, employing springs 21, 21' with different spring deflection constants.

The self-lapping valve mechanisms 16, 17 may, without substitution of any parts, readily be adjusted so as to operate as non-self-lapping valve mechanisms after any desired degree of movement of handle 83 out of normal position, in the manner now to be described.

Into the upper part of the stem-accommodating threaded bore in sleeve 39 of the valve mechanism 16 is screw-threaded an adjusting screw 90, the upper end of which is normally flush with the upper end of sleeve flange 40, as shown. If this screw 90 is screwed outwardly of sleeve 39 sufficiently to abut the inner end 91 of thimble 41 when no force is being applied to the handle, said screw will prevent upward movement of flange 40 out of contact with follower 37 and hence maintain regulating spring 21 caged at all times. Thus, when finger 66 is rocked downward in response to tilting of the handle 83, the parts 40, 37, 90, 39, 33, 19, 32 will move axially as a rigid unit against the bias of return spring 36, and thrust will be transmitted directly to the exhaust valve 32 for successively seating same against the member 31 and then unseating the supply valve 35. Supply valve 35 will remain unseated, for supplying fluid at the pressure existing in the supply port 9 to the corresponding delivery port 10, so long as manual force is maintained on the handle 83 or the slider groove 75 registers with the detents 70.

By adjusting the screw 90 to some position above flange 40 but below end 91 of thimble 41, the valve mechanism 16 will operate as a self-lapping valve to provide a selectable fluid pressure within a correspondingly smaller range of handle movement than with the screw positioned as shown in FIG. 1; and upon movement of the handle beyond said range full supply pressure will be supplied to the delivery port 10.

By similarly adjusting a screw 90' of valve mechanism 17 into contact with, or toward, end 91' of thimble 41', said valve mechanism may likewise be converted to a non-self-lapping type or to a combination self-lapping and non-self-lapping type, respectively.

Figure 7:
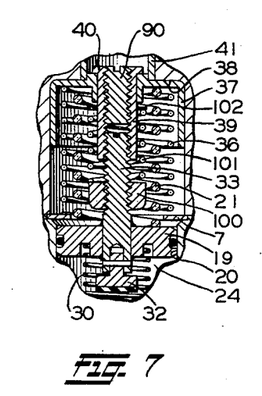
FIG. 7 is a section view showing a modified form of the self-lapping type valve mechanism shown in FIG. 1.

*Description and Operation—FIG. 7*

The self-lapping type valve mechanism constructed according to this embodiment of the invention includes all the components used in valve mechanism 16 (all of which components are accordingly denoted by the same respective reference numerals as used in FIG. 1); however, it differs from mechanism 16 in that a nut 100 is screwed onto stem 33 at a point below the sleeve 39 to serve as an axially adjustable seat for the lower end of a second regulating spring 101 that encircles said stem and at its upper end preferably bears against a washer 102 slidably mounted on said sleeve. The nut 100 is axially positioned on the stem 33 so that when the spring 101 is extended to its free or full height, the washer 102 (or upper end of said spring if the washer is not used) is spaced a selectable predetermined distance from the follower 37 when the valve mechanism is in normal position, as shown.

With these parts added, it will be seen that as the shaft 59 is rocked from normal position beyond the pick-up zone, the follower 37 will preload only the regulating spring 21 until the follower has been displaced more than said predetermined distance and commences to also preload the second regulating spring 101. Hence, this modified valve mechanism will operate to provide one rate of build-up of pressure in delivery chamber 24 until the shaft 59 is rocked to a point where the follower 37 contacts spring 101 (or washer 102) and will thereafter provide a greater rate of build-up of such pressure as said shaft is rocked beyond said point, as illustrated by the curve Z in FIG. 6. This point at which the build-up rate changes can be readily varied by varying the axial position of nut 100 on stem 33 and thereby correspondingly varying said predetermined distance without the necessity of substituting springs of different free heights for the spring 101.

This type of two build-up rate valve mechanism may desirably be used to control engagement of pneumatically engaged friction clutches, the one rate being to ease the clutch into engagement without grabbing and the greater rate being to effectively vary transmission of torque without requiring excessive handle movement.

Figure 8:
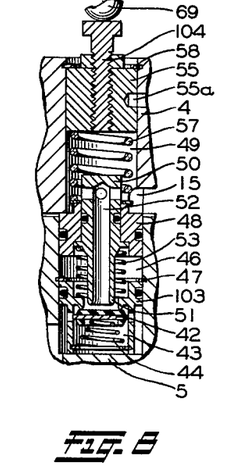
FIG. 8 is a section view showing the manner in which the non-self-lapping type valve mechanism shown in FIG. 2 may be converted to a self-lapping type valve mechanism.

*Description and Operation—FIG. 8*

The self-lapping type valve mechanism constructed according to this embodiment of the invention is substantially identical with, and may be substituted for, the non-self-lapping type mechanism 18 shown in FIG. 2; and hence like reference numerals will be used to designate identical parts. This self-lapping valve mechanism is identical with the mechanism 18 except that a bushing 103 and screw 104 of shorter axial lengths are substituted for the bushing 45 and screw 54, respectively. As a result of these substitutions, the annular member 48 is no longer held stationary but is reciprocable as an annular piston between upper and lower units defined by contact with body section 4 and with ring 47, respectively; and the lower end of screw 104 is spaced from, and no longer constantly abuts, the upper end of valve member 50; and spring 57 serves as a regulating spring as well as a return spring.

In operation, as shaft 59 is rocked, screw 104 and hence plunger 55 will be displaced axially and preload the spring 57 a corresponding degree, causing the piston 48 to shift and successively seat exhaust valve 51 and then unseat supply valve 42 against sequential resistance of light springs 53, 44. Pressure fluid will then flow past valve 42 to delivery chamber 46 and delivery port 12 until delivery chamber pressure has increased to a degree corresponding substantially to the degree of preload on spring 57; whereupon piston 48 will be shifted by such pressure against resistance of said spring to a lap position, in which the exhaust valve 51 is seated against supply valve 42 but has been retracted sufficiently to permit seating of said supply valve, and in which fluid under pressure is thus bottled up in the delivery chamber at a pressure corresponding to the displacement of screw 104 by the handle shaft.

It will thus be seen that by substituting two minor components the non-self-lapping valve mechanism 16 can readily be converted to a balanced type self-lapping valve mechanism.

Having now described the invention, what I claim as new and desire to secure by Letters Patent, is:

1. In combination, a body having a spherical surface, a shaft carried by a pivot point on the body and manually rockable relative to the pivot point concentric with said surface to perform a selectable control operation and projecting through an opening in said surface, means resiliently biasing said shaft to a normal position within said opening, detent means projecting outwardly from said surface adjacent said opening and at a point remote from the normal position of said shaft, a slider axially slidable on the shaft and having a concave surface with a groove formed therein for selectively fixing the slider to the shaft in one or the other of two rotative positions of said slider with respect to said shaft, said slider being disposed when in said one rotative position to permit and when in the other rotative position to prevent entry of said detent means into said groove, and a spring acting on said slider to bias its concave surface toward said spherical surface, said spring being of sufficient force to overcome the action of said biasing means and functionally prevent return of the shaft to normal position if manual force is removed from said shaft at a time when said detent means projects into said groove.

2. A device comprising, in combination, a body having a spherical surface with a substantially centered opening therethrough, a manually operable shaft rockably carried by the body and projecting exteriorly of said opening and variously positionable to perform corresponding control operations, return spring means operatively biasing said shaft to a normal position in which it lies in a plane intermediate two limit positions, a pair of detent means projecting outwardly from said spherical surface at opposite sides of said plane, a slider axially slidable on the shaft and having a concave surface with a groove formed therein, means for selectively fixing the slider in either of two rotative positions relative to the shaft, said slider being disposed when in one of said rotative positions to permit and when in the other rotative position to prevent entry of said detent means selectively into said groove, and a spring acting on said slider to bias its concave surface toward said spherical surface, said spring being of sufficient force to overcome the action of said return spring means and frictionally hold said shaft in one or the other of two preselected positions if while said slider is in its said one rotative position manual force is removed from the shaft when in either of such preselected positions, said preselected positions corresponding to those in which one or the other of said detent means means projects into said groove.

3. A device of the type comprising a body, manually operable means including a shaft carried by the body so as to be rockable relative to a pivot point on the body and including an operating element rigidly connected to the shaft, a plurality of return springs operatively biasing the shaft to a centered position in which it lies in a central plane passing through the pivot point, and two mechanisms for performing desired control operations and selectively actuatable by the operating element according to whether the shaft is rocked out of said plane in one direction against resistance of one of the return springs or in the opposite direction against resistance of another return spring, characterized by the provision of a spherical exterior surface on the body all points of which surface are equidistant from the pivot point, said surface bounding a substantially centered slot-like opening bisected by said plane and through which the shaft projects from the pivot point to the exterior of the body, a pair of detent means each rigidly secured to and projecting outwardly from said spherical surface at opposite sides of said plane and lying along separate great circles of said spherical surface, a slider non-rotatably mounted on and axially slidable relative to the shaft and having a concave surface substantially concentric with and overlying said spherical surface, said concave surface having a groove formed therein into which each of said detent means may selectively project upon rocking of the shaft and thereby the slider a predetermined degree in either of said directions to positions defining respective preselected positions of the shaft, and means resiliently biasing the slider axially relative to the shaft to cause said concave surface to contact said detent means, said resilient biasing means exerting sufficient force on the slider to hold the shaft in either of said preselected positions if manual force is removed from the shaft while it is so positioned, whereby with the shaft selectively held in either preselected position a corresponding one of the mechanisms will be maintained conditioned by the operating element to perform the corresponding control operation.

4. A device as defined in claim 3, further characterized in that each pair of detent means comprises two detents, the detents of each pair being elongated in the direction of, as well as lying in, a respective one of the great circles, and the detents of each pair being disposed adjacent opposite transverse sides of said slot-like opening.

5. A device as defined in claim 3, further characterized in that interlocking means are provided for locking the slider in either of two rotative positions relative to the shaft, said slider normally being locked in one of said rotative positions in which said detent means may selectively project into said groove, said slider being lockable in the other rotative position which is at substantially right angles to said one rotative position and in which said groove is so disposed relative to said detent means that the latter are incapable of projecting into said groove, whereby said resilient biasing means will be rendered effective or ineffective to operatively hold the shaft in said preselected positions according to whether said slider is disposed in said one or the other of its rotative positions, respectively.

6. A device as defined in claim 5, further characterized in that said interlocking means comprises a pin-and-slot connection provided by a pin passing transversely through the axis of the shaft and through one or the other of two transverse slots which are cut through the slider at right angles to each other, said slider being locked in said one rotative position or said other rotative position according to which of said slots said pin passes through.

7. A device comprising a body, a handle shaft projecting exteriorly of an opening through the body, means supporting said shaft for universal movement relative to a fixed pivot point within the body, said means comprising a member rotatably mounted in the body, means preventing axial movement of said member relative to said body, and a pin pivotally connecting said member to said shaft, said pivot point being defined by the point at which the axes of said member and shaft and pin intersect, a spider-like operating element rigidly mounted on said shaft intermediate said pivot point and opening, said operating element having three fingers which project radially away from the shaft, the first and second of these fingers extending in opposite directions and being arranged at right angles to the third finger, three return springs each operatively acting on a respective one of said fingers and cooperating to bias said shaft to a normal position, and three mechanisms each controlled by displacement of a respective one of said fingers against the action of its corresponding return spring to perform a respective control operation, said handle shaft being rockable within one plane in opposite directions out of normal position to selectively displace said first and second fingers and thereby selectively actuate two of said mechanisms, and said handle shaft when in any position within said plane being rockable transversely of said plane to depress said third finger and thereby actuate the third mechanism independently of or concurrently with either of said two mechanisms.

8. A device according to claim 7, including means for caging each of said return springs when said shaft is in normal position to render each return spring ineffective to bias said shaft beyond normal position.

9. A device according to claim 7, wherein said opening is in part defined by a perimetral ledge for supporting a selectable one of a plurality of plates of various configuration for changing the effective configuration of said opening, said plates providing stop surfaces laterally engageable by the handle shaft, whereby said shaft is constrained for rocking movement within preselectable desired limits to correspondingly control operation of the respective mechanisms.

10. A device according to claim 7, wherein said opening is in part defined by a perimetral ledge for supporting a selectable one of a plurality of plates of various configuration for changing the effective configuration of said opening, said plates providing stop surfaces laterally engageable by the handle shaft, whereby rocking movement of the shaft against resistance of a particular one of the return springs may be completely prevented for blocking the corresponding mechanism out of operation or may be partially prevented for limiting the degree of such rocking movement, and whereby said shaft may be constrained to rock in a defined path to correspondingly control operation of certain of said mechanisms in a desired sequence.

11. In combination, a body having a spherical surface, a shaft carried by a pivot point on the body and manually rockable relative to the pivot point concentric with said surface to perform a selectable control operation and projecting through an opening in said surface, means resiliently biasing said shaft to a normal position within said opening, detent means projecting outwardly from said surface adjacent said opening and at a point spaced from the normal position of said shaft, a slider axially slidable on the shaft and having a concave surface with track means formed thereon, said slider being disposed to permit engagement of said detent means with said track means when said shaft is moved about said pivot away from said normal position to move said track means to the detent means, and a spring acting on said slider to bias its concave surface toward said spherical surface, said spring being of sufficient force to overcome the action of said biasing means and functionally prevent return of the shaft to normal position if manual force is removed from said shaft at a time when said detent means engages said track means.

12. The combination of claim 11 in which said detent means comprise a pair of detent means each rigidly secured to and projecting outwardly from said spherical surface at opposite sides of said opening and lying along separate great circles of said spherical surface.

References Cited in the file of this patent

UNITED STATES PATENTS

| | | |
|---|---|---|
| 1,923,290 | Wood | Aug. 22, 1933 |
| 2,345,224 | Upp | Mar. 28, 1944 |
| 2,346,820 | Caster | Apr. 18, 1944 |
| 2,700,904 | Woods | Feb. 1, 1955 |
| 2,722,233 | Schneck | Nov. 1, 1955 |
| 2,725,890 | Kanuch | Dec. 6, 1955 |
| 2,815,042 | Passaggio | Dec. 3, 1957 |

UNITED STATES PATENT OFFICE
CERTIFICATE OF CORRECTION

Patent No. 3,131,573            May 5, 1964

Arthur J. Bent

It is hereby certified that error appears in the above numbered patent requiring correction and that the said Letters Patent should read as corrected below.

Column 9, line 67, for "a groove formed therein for selectively fixing the slider" read -- a groove formed therein, means for selectively fixing the slider --.

Signed and sealed this 12th day of January 1965.

(SEAL)
Attest:

ERNEST W. SWIDER
Attesting Officer

EDWARD J. BRENNER
Commissioner of Patents